United States Patent
Bose et al.

(10) Patent No.: US 10,990,600 B1
(45) Date of Patent: Apr. 27, 2021

(54) TRUSTWORTHINESS SCORE ENGINE

(71) Applicant: Wells Fargo Bank, N.A., San Francisco, CA (US)

(72) Inventors: Swati Bose, Hyderabad (IN); Rameshchandra Bhaskar Ketharaju, Hyderabad (IN); Arshad A. Shaik, Anantapur (IN)

(73) Assignee: WELLS FARGO BANK, N.A., San Francisco, CA (US)

( * ) Notice: Subject to any disclaimer, the term of this patent is extended or adjusted under 35 U.S.C. 154(b) by 249 days.

(21) Appl. No.: 15/812,600

(22) Filed: Nov. 14, 2017

(51) Int. Cl.
| | |
|---|---|
| *G06F 16/00* | (2019.01) |
| *G06F 16/2457* | (2019.01) |
| *G06K 9/00* | (2006.01) |
| *G06F 16/2458* | (2019.01) |
| *G06F 16/9535* | (2019.01) |
| *G06Q 50/00* | (2012.01) |

(52) U.S. Cl.
CPC .... *G06F 16/24578* (2019.01); *G06F 16/2477* (2019.01); *G06F 16/9535* (2019.01); *G06K 9/00335* (2013.01); *G06Q 50/01* (2013.01)

(58) Field of Classification Search
CPC ................................................ G06F 16/24578
See application file for complete search history.

(56) References Cited

U.S. PATENT DOCUMENTS

| | | | | |
|---|---|---|---|---|
| 2014/0337093 | A1* | 11/2014 | Jain | G06Q 30/0201 705/7.29 |
| 2014/0359439 | A1* | 12/2014 | Lyren | G06F 16/951 715/705 |

* cited by examiner

*Primary Examiner* — Ajith Jacob
(74) *Attorney, Agent, or Firm* — Walter Haverfield LLP; James J. Pingor

(57) ABSTRACT

The innovation disclosed and claimed herein, in one aspect thereof, comprises systems and methods of providing trust recommendations. The innovation receives fidelity data of an advisor. The fidelity data can include audio or visual data of the advisor in which the advisor is providing advice. A trust score for the advisor is determined based on a biometric or other analysis of the fidelity data. The trust score is compared to a threshold trust score to determine a recommendation to the user. The recommendation can be to trust or distrust the advisor or the advice. The recommendation is communicated or otherwise provided to the user.

18 Claims, 7 Drawing Sheets

TRUSTWORTHINESS SCORE ENGINE

BACKGROUND

Various advisors provide financial advice, whether in person or on television to user. The financial advice is relied upon to make important decisions regarding a user's accounts and investments. However, it is challenging to determine the accuracy or trustworthiness of a financial advisor. A natural language processing system may be able to inform the user regarding the trustworthiness of the advisor's assertions.

BRIEF SUMMARY OF THE DESCRIPTION

The following presents a simplified summary of the innovation in order to provide a basic understanding of some aspects of the innovation. This summary is not an extensive overview of the innovation. It is not intended to identify key/critical elements of the innovation or to delineate the scope of the innovation. Its sole purpose is to present some concepts of the innovation in a simplified form as a prelude to the more detailed description that is presented later.

The innovation disclosed and claimed herein, in one aspect thereof, comprises systems and methods of providing a trust recommendation to a user. A method of the innovation can begin by receiving fidelity data of an advisor to a user. A trust score for the advisor is determined based on the fidelity data, the fidelity data having one or more factors. A recommendation is provided to the user based on the trust score of the advisor.

A system of the innovation can include a data component that receives fidelity data of an advisor to a user. The system can include a calculation component that determines a trust score for the advisor based on the fidelity data, the fidelity data having one or more factors. The system can include a trust component that provides a recommendation to the user based on the trust score of the advisor.

A computer readable medium of the innovation can have instructions to control one or more processors configured to receive fidelity data of an advisor to a user. The instructions can analyze the fidelity data, where the fidelity data is audio or visual data of the advisor in which the advisor is providing advice. The instructions can determine a trust score for the advisor based on the analysis of the fidelity data. The instructions can compare the determined trust score to a threshold trust score to determine a recommendation and provide the recommendation to the user.

In aspects, the subject innovation provides substantial benefits in terms of authenticating advice. One advantage resides in a more secure knowledge of the trustworthiness of an advisor. Another advantage resides in determining unbiased and competent advice.

To the accomplishment of the foregoing and related ends, certain illustrative aspects of the innovation are described herein in connection with the following description and the annexed drawings. These aspects are indicative, however, of but a few of the various ways in which the principles of the innovation can be employed and the subject innovation is intended to include all such aspects and their equivalents. Other advantages and novel features of the innovation will become apparent from the following detailed description of the innovation when considered in conjunction with the drawings.

BRIEF DESCRIPTION OF THE DRAWINGS

Aspects of the disclosure are understood from the following detailed description when read with the accompanying drawings. It will be appreciated that elements, structures, etc. of the drawings are not necessarily drawn to scale. Accordingly, the dimensions of the same may be arbitrarily increased or reduced for clarity of discussion, for example.

DETAILED DESCRIPTION

Figure 1:
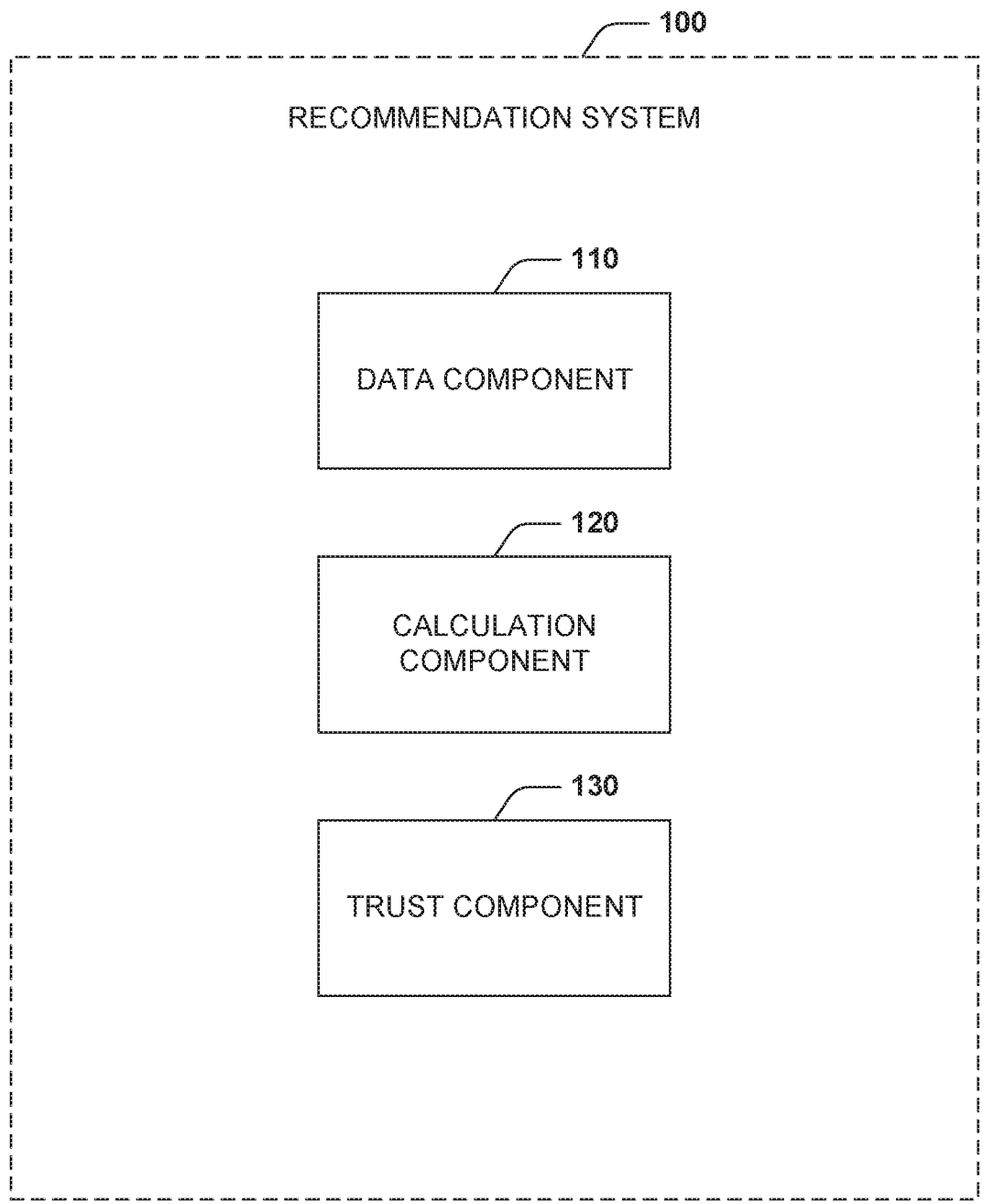
FIG. 1 illustrates an example component diagram of a recommendation system.

The innovation is now described with reference to the drawings, wherein like reference numerals are used to refer to like elements throughout. In the following description, for purposes of explanation, numerous specific details are set forth in order to provide a thorough understanding of the subject innovation. It may be evident, however, that the innovation can be practiced without these specific details. In other instances, well-known structures and devices are shown in block diagram form in order to facilitate describing the innovation.

As used in this application, the terms "component", "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, or a computer. By way of illustration, both an application running on a controller and the controller can be a component. One or more components residing within a process or thread of execution and a component may be localized on one computer or distributed between two or more computers.

Furthermore, the claimed subject matter can be implemented as a method, apparatus, or article of manufacture using standard programming or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

While certain ways of displaying information to users are shown and described with respect to certain figures as screenshots, those skilled in the relevant art will recognize that various other alternatives can be employed. The terms "screen," "web page," "screenshot," and "page" are generally used interchangeably herein. The pages or screens are stored and/or transmitted as display descriptions, as graphical user interfaces, or by other methods of depicting information on a screen (whether personal computer, PDA, mobile telephone, or other suitable device, for example) where the layout and information or content to be displayed on the page is stored in memory, database, or another storage facility.

FIG. 1 illustrates a recommendation system 100 for providing a trustworthiness recommendation to a user. The recommendation system 100 includes a data component 110. The data component 110 receives fidelity data of an advisor to a user. The data component 110 can receive audio and/or visual (A/V) data of an advisor. In some embodiments, the A/V data is of an advisor in which they are providing advice for a user to potentially rely on in making a decision. In some embodiments, the advisor is a financial advisor. In other embodiments, the financial advisor is a television personality giving advice to the general public via a television show or other media content distribution.

In some embodiments, the data component 110 can receive historical data about the advisor. The historical data can include previous advice provided by the advisor and the performance of such advice over time. In other embodiments, the data component 110 can receive social media data about the advisor. The social media data can include connections between the advisor and the advice subject on a social media website and/or the like. The social media data can be analyzed to determine potential conflicts or specialized knowledge of a subject.

The recommendation system 100 includes a calculation component 120 that determines a trust score for the advisor. The calculation component 120 analyzes the fidelity data for one or more factors that affect the trust score of the advisor. For example, the data component 110 can receive A/V data of the advisor. The A/V data is analyzed by the calculation component 120 for biometric indicators of the advisor that translate to authenticity, bias, truthfulness, and/or the like. The biometric indicators, or factors, can include one of voice modulation, body language analysis, pupil direction, pupil dilation, vein dilation, and/or skin color analysis. In some embodiments, the A/V data is analyzed for multiple factors or all factors. In other embodiments, the trust score is determined as a weighted average of the outputs of the analysis of some or all of the biometric indicators.

The calculation component 120 can analyze historical data of the advisor to facilitate calculation of the trust score. For example, the performance of previous advice, such as a stock pick, can be analyzed to determine competency of the advisor. The analysis is factored into the trust score.

In some embodiments, the calculation component 120 can analyze social media connections of the advisor. For example, the calculation component 120 analyzes the social media connections for potential conflicts of interest between the advisor and the advice subject. In some embodiment, the social media connections can also be analyzed to determine specialized knowledge, insider knowledge, and/or the like.

The recommendation system 100 includes a trust component 130 that provides a recommendation to the user based on the trust score of the advisor. The trust component 130 receives the trust score from the calculation component 120. The trust component 130 provides a recommendation of either to trust the advisor (or advice) or distrust. In some embodiments, the trust component 130 compares the trust score to a threshold score, where if the trust score meets the threshold score, the recommendation is to trust the advisor. If the trust score does not meet the threshold score, the recommendation is to distrust the advisor. In other embodiments, the trust component 130 can provide a degree of trust or range of trust levels such as completely trust, somewhat trust, slightly trust, neutral, slightly distrust, somewhat distrust, or completely distrust. The trust component 130 can apply a range of threshold scores to determine which trust level applies to the trust score for the recommendation to the user.

Figure 2:
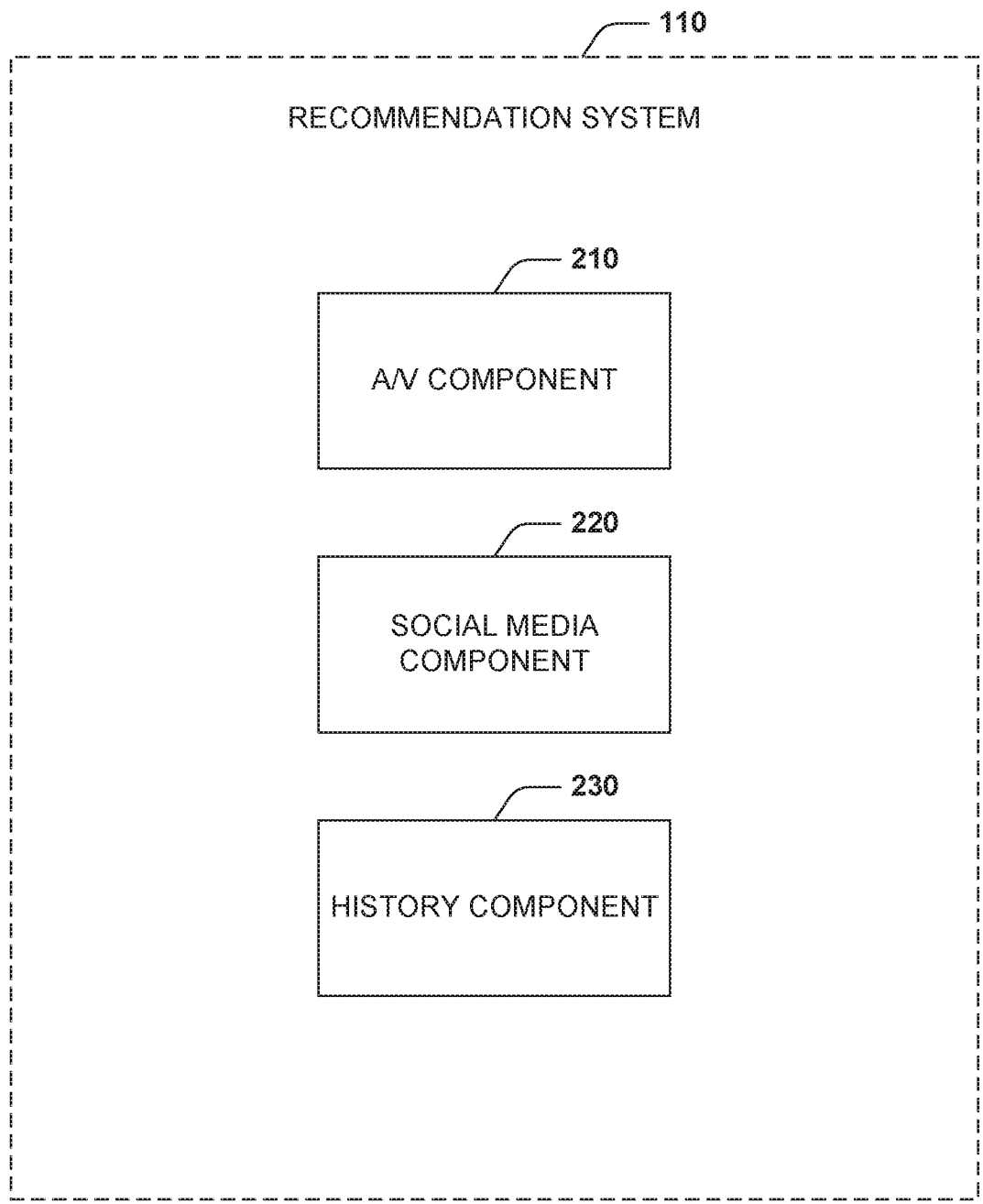
FIG. 2 illustrates an example component diagram of a data component.

FIG. 2 illustrates a detailed component diagram of the data component 110. The data component 110 receives fidelity data of an advisor. The data component 110 includes an A/V component 210 that can receive audio and/or visual (A/V) data of an advisor. The A/V component 210 receives the A/V data of an advisor in which they are providing advice for a user to potentially rely on in making a decision. The A/V component 210 can view different video sources to compile A/V data of an advisor. The A/V component 210 can receive streaming video over the internet, live television broadcast, a digital video recorder, and/or the like. In some embodiments, the A/V component 210 receives a video file from the user so that a recommendation can be provided.

The data component 110 includes a social media component 220 that can receive social media data about the advisor. The social media component 220 accesses social media networks, accounts associated with the advisor on the social media networks, and/or connections on the social media networks. The social media data can include connections between the advisor and the advice subject. The social media data can be analyzed to determine potential conflicts or insider knowledge of a subject. For example, the social media connections can reveal that the advisor is recent friends with the chief operating officer of a company on which advice is being given. This can affect the trust score negatively as a possible bias in the advice.

The data component 110 can include a history component 230 that receives historical data about the advisor. The historical data can include previous advice provided by the advisor and the performance of such advice over time. In some embodiments, the history component 230 can access financial data, stock market information, trading platforms, and/or the like to receive performance information relevant to the advice. In some embodiments, the history component 230 can receive A/V data from the A/V component of past advice to track performance of the advice.

Figure 3:
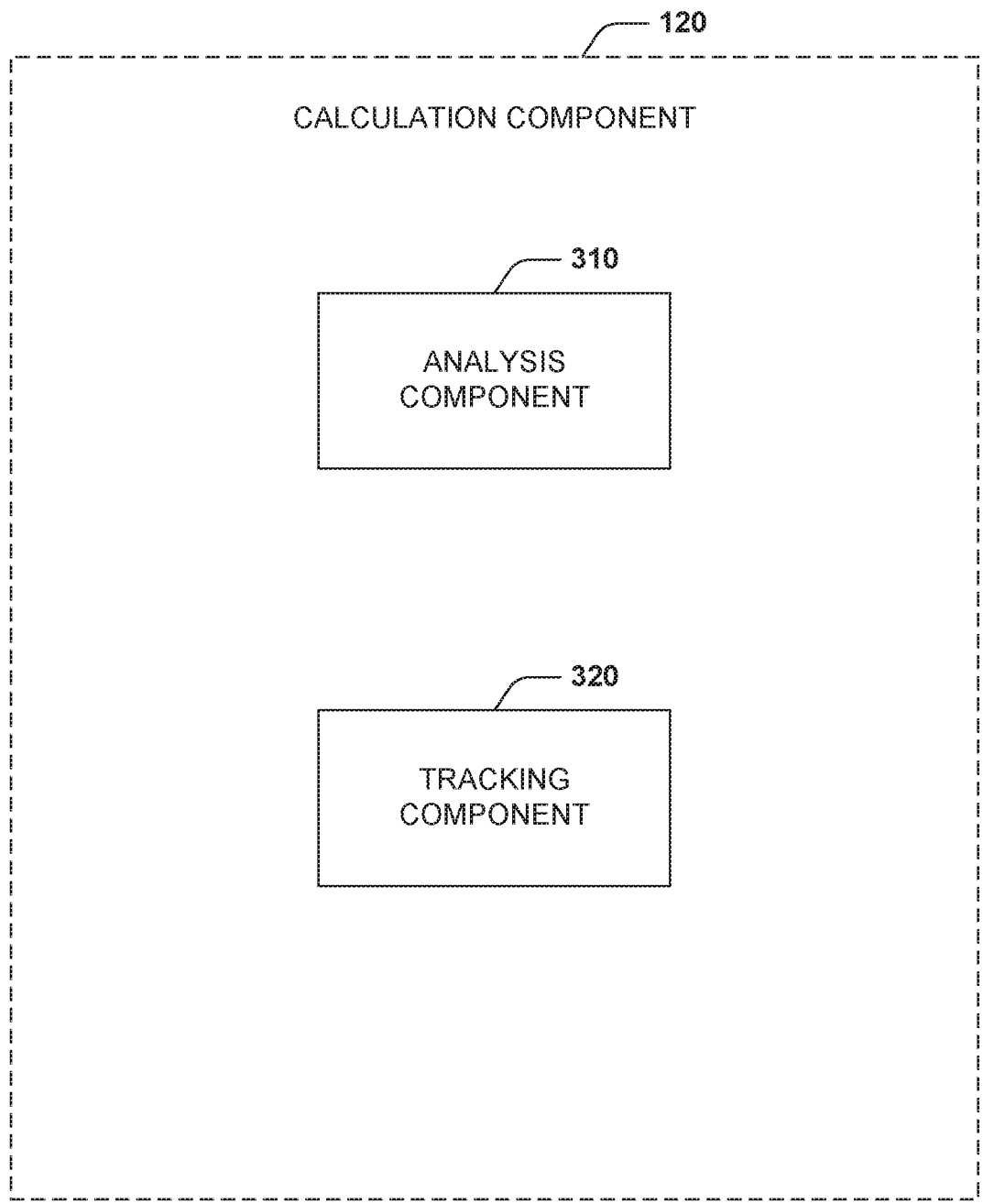
FIG. 3 illustrates an example component diagram of a calculation component.

FIG. 3 illustrates a component diagram of the calculation component 120. The calculation component 120 includes an analysis component 310 that analyzes the fidelity data for factors that affect the trust score of the advisor. For example, the data component 110 can receive A/V data of the advisor. The A/V data is analyzed by the calculation component 120 for biometric indicators of the advisor that translate to authenticity, bias, truthfulness, and/or the like. The biometric indicators, or factors, can include one of voice modulation, body language analysis, pupil direction, pupil dilation, vein dilation, and/or skin color analysis. In some embodiments, the A/V data is analyzed for multiple or all factors. In other embodiments, the trust score is determined as a weighted average of the analysis of some or all of the biometric indicators.

The analysis component 310 can analyze the historical data of the advisor to facilitate calculation of the trust score. For example, the advisor recommends investing in stock, ABC. The analysis component 310 can view previous recommendations by the advisor of stock ABC or another stock, XYZ. The analysis component 310 tracks whether the previous advice was good or bad advice according of the performance of the stocks after following the advice. In some embodiments, the analysis component 310 can compute a competency metric that can be factored into the trust score based on the performance of the previous advice.

In some embodiments, the analysis component 310 can analyze social media connections of the advisor. For example, the analysis component 310 analyzes the social media connections for potential conflicts of interest between the advisor and the advice subject as described above. In some embodiments, the social media connections can also be analyzed to determine specialized knowledge, insider knowledge, and/or the like. The analysis component 310 can determine a bias metric that can be factored into the trust score based on the amount of social media connections between the advisor and the advice subject. For example, an advisor with a high number of social media connections to the advice subject may have a high bias metric.

The calculation component 120 can include a tracking component 320 that determines a tracking trust score. The tracking component 320 can determine the tracking trust score in real or near-real time while the advisor is providing advice, for example, in a video. The tracking trust score changes according to the advice subject and/or biometric differences in the video of the advisor providing advice.

Figure 4:
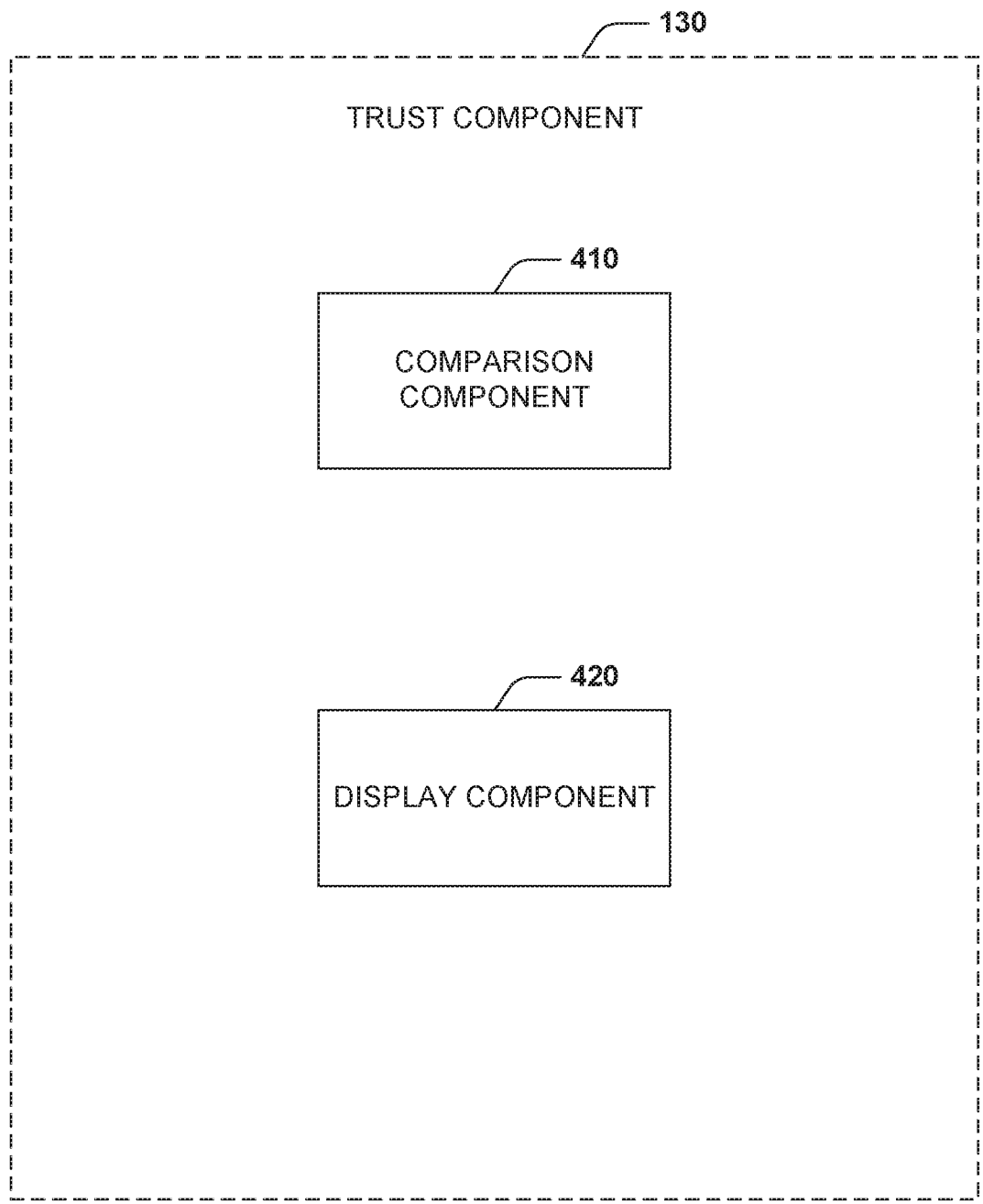
FIG. 4 illustrates an example component diagram of a trust component.

FIG. 4 illustrates a component diagram of the trust component 130. The trust component 130 includes a comparison component 410 that facilitates a recommendation to the user based on the trust score of the advisor. The comparison component 410 receives the trust score from the calculation component 120. The comparison component 410 compares the trust score to a threshold score stored at the comparison component 410, where if the trust score meets the threshold score, the recommendation is to trust the advisor. If the trust score does not meet the threshold score, the recommendation is to distrust the advisor. In other embodiments, the trust component 130 can provide a degree of trust or range of trust levels such as completely trust, somewhat trust, slightly trust, neutral, slightly distrust, somewhat distrust, or completely distrust. The trust component 130 can apply a range of threshold scores to determine which trust level applies to the trust score for the recommendation to the user.

The trust component 130 includes an output component 420 that outputs the trust score, the recommendation, and/or the tracking trust score to the user. The output component 420 can be a user interface, graphical user interface, display, alert, email, push notification, and/or the like such that the user receives the output. In some embodiments, the output component 420 can generate a combined presentation of the A/V data and the trust score, recommendation, and/or tracking trust score that can be viewed by the user either on a display of the output component 420 or a user device configured to receive and display the presentation.

Figure 5:
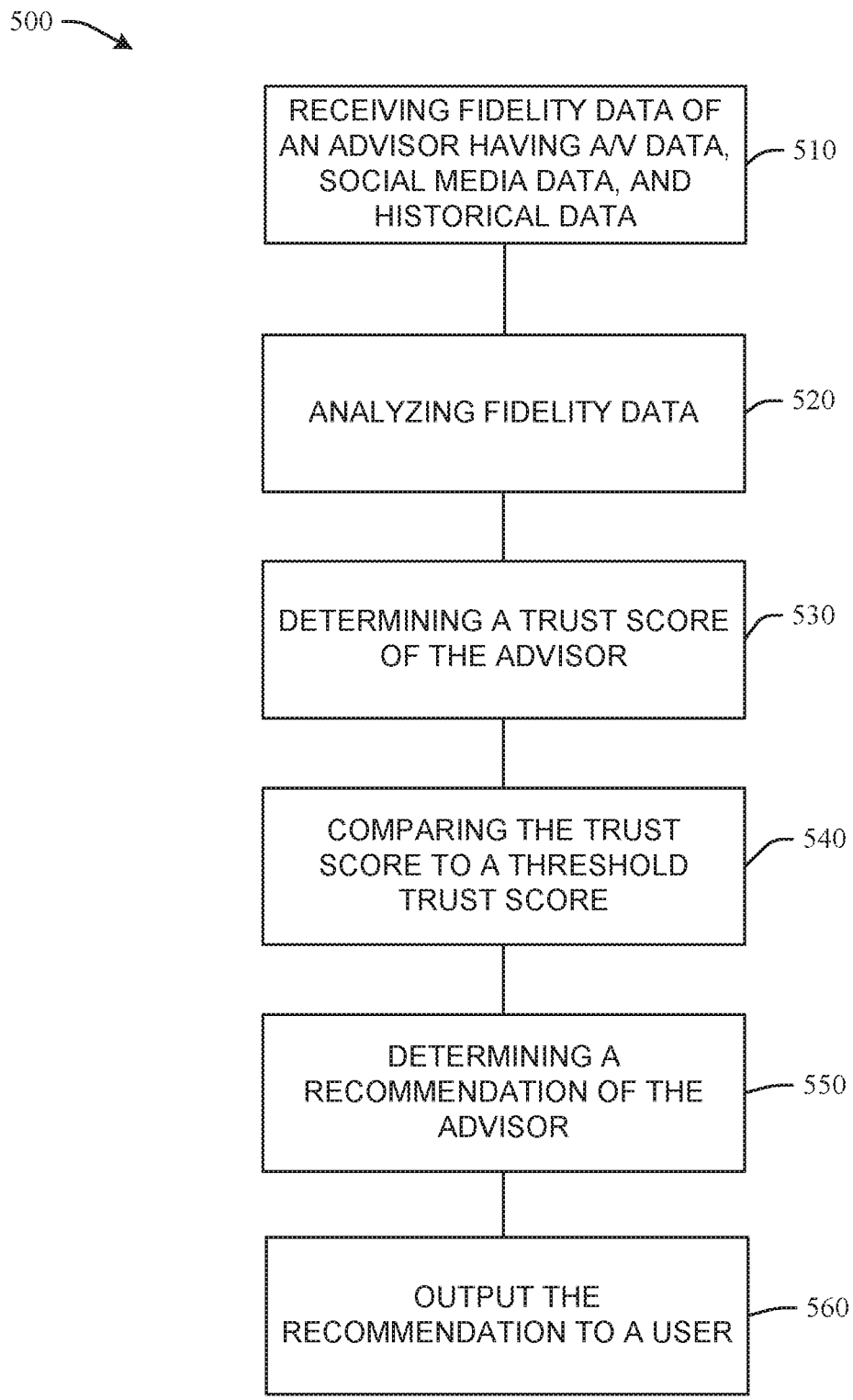
FIG. 5 illustrates a method for providing a trust recommendation to a user.

With reference to FIG. 5, example methods 500 are depicted for authenticating a user to verify identity. While, for purposes of simplicity of explanation, the one or more methodologies shown herein, e.g., in the form of a flow chart, are shown and described as a series of acts, it is to be understood and appreciated that the subject innovation is not limited by the order of acts, as some acts may, in accordance with the innovation, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation. It is also appreciated that the method 500 are described in conjunction with a specific example is for explanation purposes.

FIG. 5 illustrates a method 500 for determining trust recommendations for advisors. At 510; fidelity data of an advisor is received. The fidelity data can be A/V data of the advisor providing advice, social media data of the advisor, and/or historical data of previous advice. At 520, the fidelity data is analyzed according to factors affecting a trust score. For example, A/V data can be analyzed for biometric indicators of trustworthiness, as described above. The social media data is analyzed for potential conflicts or biases. The historical data is analyzed for competency of the advisor.

At 530, a trust score is determined for the advisor based on the analysis. In some embodiments, the trust score can be calculated based on an aggregate, average, or weighted average of results of the analysis of each factor. For example, the color change analysis of an advisor's face in A/V data can result in a score of likelihood of truthfulness. The social media analysis can result in a score of likelihood of bias existing. Each score can be normalized to the same scale or range such as 0% to 100% likelihood of being truthful. In this example, the two scores can be aggregated, averaged, or weighted averaged to determine the trust score.

At 540, the determined trust score is compared to a threshold trust score to provide a recommendation to the user. For example, the threshold trust score can be 50 out of 100, where above 50 means the advisor is more likely telling the truth than not. In some embodiments, the determined trust score is compared according to tiers of threshold scores to indicate different levels of trust as described above.

At 550, a recommendation is determined for the user based on the trust score of the advisor. The recommendation can be to trust or distrust. In some embodiments, the recommendation can be a degree of which to trust the advisor. At 560, the recommendation is outputted to the user. The recommendation, the trust score, and/or the like can be provided to the user in an alert, notification, text, email, user interface, or integrated into A/V data.

Figure 6:
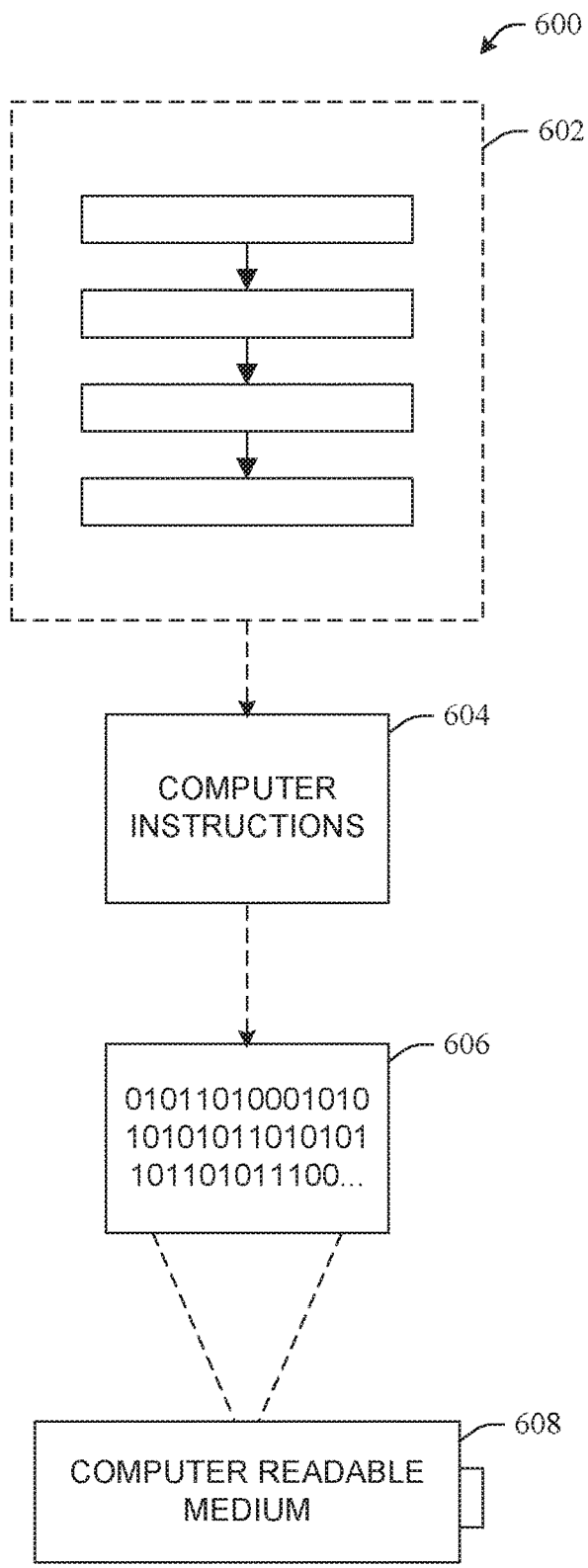
FIG. 6 illustrates a computer-readable medium or computer-readable device comprising processor-executable instructions configured to embody one or more of the provisions set forth herein, according to some embodiments.

Still another embodiment can involve a computer-readable medium comprising processor-executable instructions configured to implement one or more embodiments of the techniques presented herein. An embodiment of a computer-readable medium or a computer-readable device that is devised in these ways is illustrated in FIG. 6, wherein an implementation 600 comprises a computer-readable medium 608, such as a CD-R, DVD-R, flash drive, a platter of a hard disk drive, etc., on which is encoded computer-readable data 606. This computer-readable data 606, such as binary data comprising a plurality of zero's and one's as shown in 606, in turn comprises a set of computer instructions 604 configured to operate according to one or more of the principles set forth herein. In one such embodiment 600, the processor-executable computer instructions 604 is configured to perform a method 602, such as at least a portion of one or more of the methods described in connection with embodiments disclosed herein. In another embodiment, the processor-executable instructions 604 are configured to implement a system, such as at least a portion of one or more of the systems described in connection with embodiments disclosed herein. Many such computer-readable media can be devised by those of ordinary skill in the art that are configured to operate in accordance with the techniques presented herein.

Figure 7:
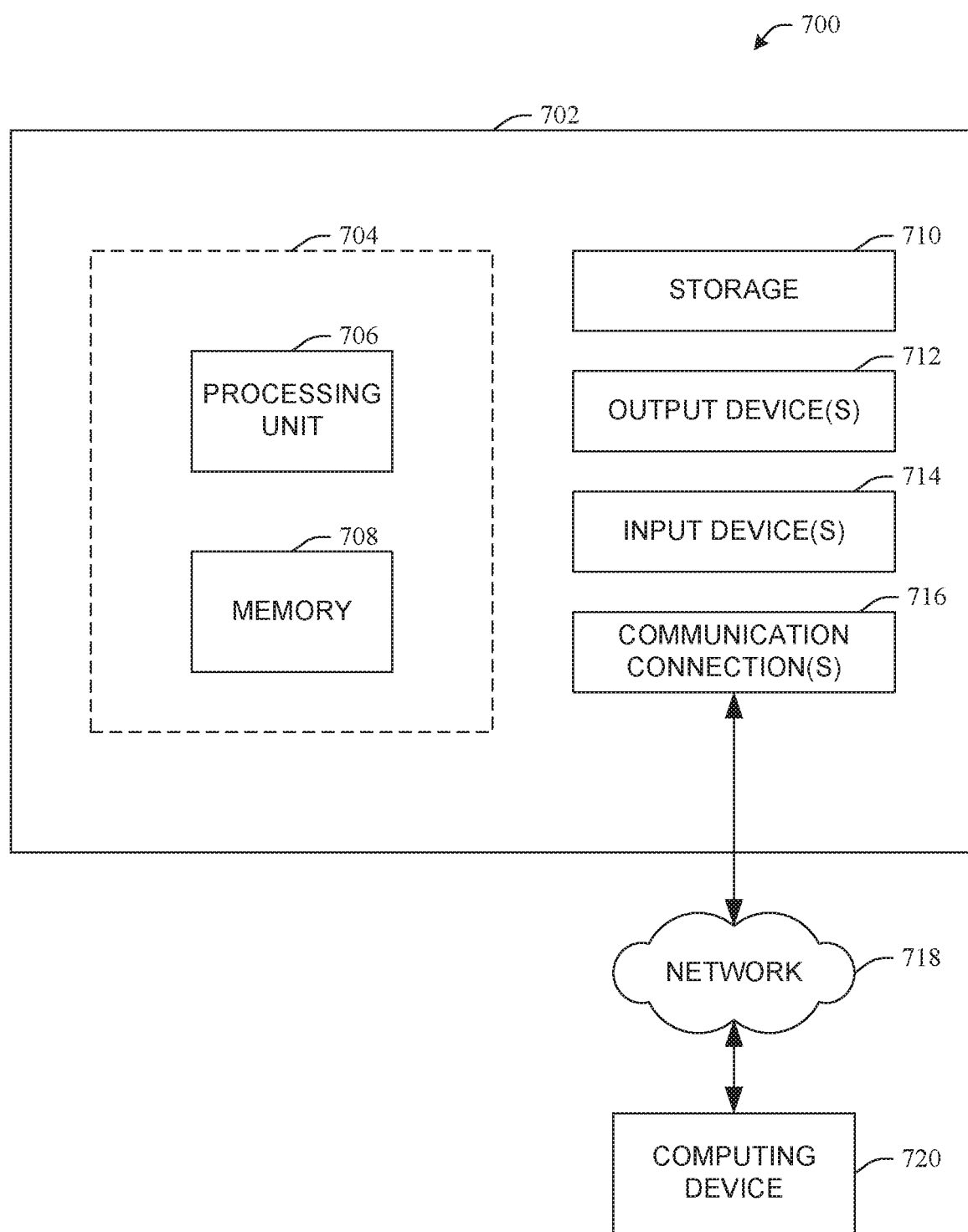
FIG. 7 illustrates a computing environment where one or more of the provisions set forth herein can be implemented, according to some embodiments.

With reference to FIG. 7 and the following discussion provide a description of a suitable computing environment in which embodiments of one or more of the provisions set forth herein can be implemented. The operating environment of FIG. 7 is only one example of a suitable operating environment and is not intended to suggest any limitation as to the scope of use or functionality of the operating environment. Example computing devices include, but are not limited to, personal computers, server computers, hand-held or laptop devices, mobile devices, such as mobile phones, Personal Digital Assistants (PDAs), media players, tablets, and the like, multiprocessor systems, consumer electronics, mini computers, mainframe computers, distributed computing environments that include any of the above systems or devices, and the like.

Generally, embodiments are described in the general context of "computer readable instructions" being executed by one or more computing devices. Computer readable instructions are distributed via computer readable media as will be discussed below. Computer readable instructions can be implemented as program modules, such as functions, objects, Application Programming Interfaces (APIs), data structures, and the like, that perform particular tasks or implement particular abstract data types. Typically, the functionality of the computer readable instructions can be combined or distributed as desired in various environments.

FIG. 7 illustrates a system 700 comprising a computing device 702 configured to implement one or more embodiments provided herein. In one configuration, computing device 702 can include at least one processing unit 706 and memory 708. Depending on the exact configuration and type of computing device, memory 708 may be volatile, such as RAM, non-volatile, such as ROM, flash memory, etc., or some combination of the two. This configuration is illustrated in FIG. 7 by dashed line 704.

In these or other embodiments, device 702 can include additional features or functionality. For example, device 702 can also include additional storage such as removable storage or non-removable storage, including, but not limited to, magnetic storage, optical storage, and the like. Such additional storage is illustrated in FIG. 7 by storage 710. In some embodiments, computer readable instructions to implement one or more embodiments provided herein are in storage 710. Storage 710 can also store other computer readable instructions to implement an operating system, an application program, and the like. Computer readable instructions can be accessed in memory 708 for execution by processing unit 706, for example.

The term "computer readable media" as used herein includes computer storage media. Computer storage media includes volatile and nonvolatile, non-transitory, removable and non-removable media implemented in any method or technology for storage of information such as computer readable instructions or other data. Memory 708 and storage 710 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 702. Any such computer storage media can be part of device 702.

The term "computer readable media" includes communication media. Communication media typically embodies computer readable instructions or other data in a "modulated data signal" such as a carrier wave or other transport mechanism and includes any information delivery media. The term "modulated data signal" includes a signal that has one or more of its characteristics set or changed in such a manner as to encode information in the signal.

Device 702 can include one or more input devices 714 such as keyboard, mouse, pen, voice input device, touch input device, infrared cameras, video input devices, or any other input device. One or more output devices 712 such as one or more displays, speakers, printers, or any other output device can also be included in device 702. The one or more input devices 714 and/or one or more output devices 712 can be connected to device 702 via a wired connection, wireless connection, or any combination thereof. In some embodiments, one or more input devices or output devices from another computing device can be used as input device(s) 714 or output device(s) 712 for computing device 702. Device 702 can also include one or more communication connections 716 that can facilitate communications with one or more other devices 720 by means of a communications network 718, which can be wired, wireless, or any combination thereof, and can include ad hoc networks, intranets, the Internet, or substantially any other communications network that can allow device 702 to communicate with at least one other computing device 720.

What has been described above includes examples of the innovation. It is, of course, not possible to describe every conceivable combination of components or methodologies for purposes of describing the subject innovation, but one of ordinary skill in the art may recognize that many further combinations and permutations of the innovation are possible. Accordingly, the innovation is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method, comprising:
 receiving fidelity data of an advisor associated with a user, wherein the fidelity data having one or more factors and wherein the fidelity data includes recorded audio visual data of the advisor in which the advisor is providing advice;
 analyzing the fidelity data;
 determining a trust score of the advisor based on the analysis of the fidelity data wherein determining the trust score comprises:
  receiving social media connections data of the advisor, wherein the social media connections data includes one or more social media accounts connected to the advisor over a social media network; and
  analyzing the social media connections data for biases towards or against one or more stocks based on the analysis of the one or more social media accounts as they relate to the one or more stocks; and
 providing a recommendation to the user based on the trust score of the advisor.

2. The method of claim 1, wherein the factors include at least one of voice modulation, body language, pupil direction, pupil dilation, vein dilation, or skin color analysis.

3. The method of claim 1, comprising:
 receiving historical data of the advisor, wherein the historical data includes previous advice and performance of previous advice; and
 analyzing the historical data to affect the trust score.

4. The method of claim 1, wherein the trust score is a weighted average of historical data, social media data, and audio-visual data.

5. The method of claim 1, comprising:
 comparing the determined trust score to a threshold trust score to determine the recommendation to the user.

6. The method of claim 1, wherein the recommendation is trust the advisor or distrust the advisor based on the trust score.

7. The method of claim 1, comprising:
determining a tracking trust score, wherein the tracking trust score is determined alongside the advisor providing the advice in real time; and
displaying the tracking trust score concurrently in real time with the audio-visual data.

8. A system, comprising:
a data component that receives fidelity data of an advisor associated with a user, wherein the fidelity data having one or more factors and wherein the fidelity data includes recorded audio visual data of the advisor in which the advisor is providing advice;
an A/V processing component that analyzes the fidelity data;
a calculation component that determines a trust score of the advisor based on the analysis of the fidelity data wherein determining the trust score comprises:
receiving social media connections data of the advisor, wherein the social media connections data includes one or more social media accounts connected to the advisor over a social media network; and
analyzing the social media connections data for biases towards or against one or more stocks based on the analysis of the one or more social media accounts as they relate to the one or more stocks; and
a trust component that provides a recommendation to the user based on the trust score of the advisor.

9. The system of claim 8, wherein the factors include at least one of voice modulation, body language, pupil direction, pupil dilation, vein dilation, or skin color analysis.

10. The system of claim 8, comprising:
wherein the data component receives historical data of the advisor, wherein the historical data includes previous advice and performance of previous advice; and
the calculation component analyzes the historical data to affect the trust score.

11. The system of claim 8, wherein the trust score is a weighted average of historical data, social media data, and audio-visual data.

12. The system of claim 8, wherein the trust component comprises:
a comparison component that compares the determined trust score to a threshold trust score to provide the recommendation to the user.

13. The system of claim 12, wherein the trust component provides the recommendation as trust the advisor or distrust the advisor based on the trust score and the comparison.

14. The system of claim 8, comprising:
wherein the calculation component comprises:
a tracking component that determines a tracking trust score, wherein the tracking trust score is determined live in real time alongside the advisor providing the advice; and
the trust component comprises:
a display that presents the tracking trust score concurrently in real time with the audio-visual data.

15. A non-transitory computer readable medium having instructions to control one or more processors configured to:
receive fidelity data of an advisor to a user, wherein the fidelity data is recorded audio or visual data of the advisor in which the advisor is providing advice;
analyze the fidelity data,
determine a trust score for the advisor based on the analysis of the fidelity data wherein determining the trust score comprises:
receiving social media connections data of the advisor, wherein the social media connections data includes one or more social media accounts connected to the advisor over a social media network; and
analyzing the social media connections data for biases towards or against one or more stocks based on the analysis of the one or more social media accounts as they relate to the one or more stocks; and
compare the determined trust score to a threshold trust score to determine a recommendation to the user;
provide the recommendation to the user.

16. The non-transitory computer readable medium of claim 15, wherein the one or more processors are further configured to:
analyze the fidelity data for one or more biometric indicators that determine trustworthiness.

17. The method of claim 1, comprising:
comparing the determined trust score to a plurality of threshold trust scores;
providing the recommendation as a degree of trust based on the comparison to the plurality of threshold trust scores.

18. The method of claim 17, comprising:
wherein the degree of trust is one of completely trust, somewhat trust, slightly trust, neutral, slightly distrust, somewhat distrust, or completely distrust, wherein each degree of trust corresponds to an associated trust threshold.

* * * * *